(No Model.)
J. H. & B. F. POLHEMUS.
SPOKESHAVE.
No. 383,590. Patented May 29, 1888.
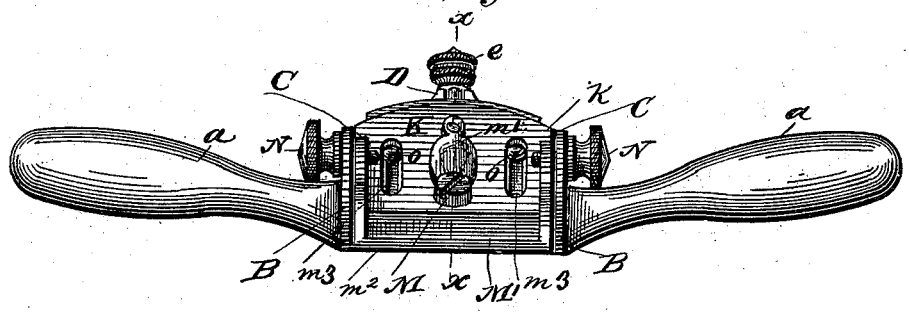
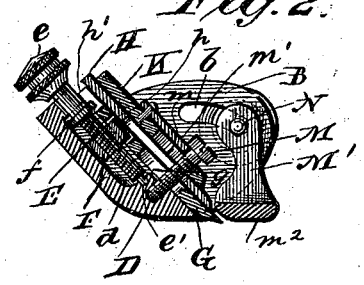
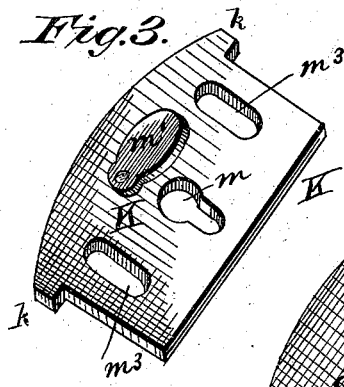
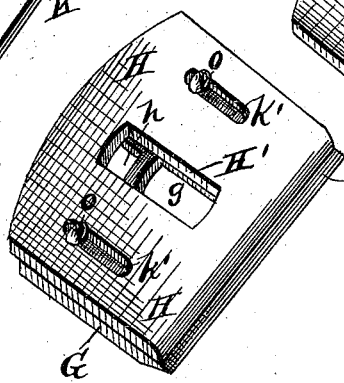
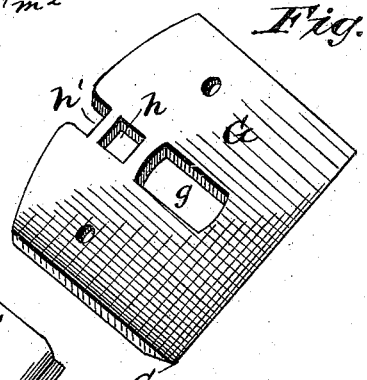
WITNESSES:
INVENTOR:
BY
ATTORNEYS.

UNITED STATES PATENT OFFICE.

JAMES H. POLHEMUS AND BENGAMIN F. POLHEMUS, OF BROOKLYN, NEW YORK.

SPOKESHAVE.

SPECIFICATION forming part of Letters Patent No. 383,590, dated May 29, 1888.

Application filed January 20, 1888. Serial No. 261,377. (No model.)

*To all whom it may concern:*

Be it known that we, JAMES H. POLHEMUS and BENGAMIN F. POLHEMUS, of Brooklyn, in the county of Kings and State of New York, have invented a new and Improved Spokeshave, of which the following is a full, clear, and exact description.

Our invention relates to spokeshaves, and has for its object to provide a tool capable of use as readily in curves of small radius as upon a flat surface, and, further, to produce an improvement upon the spokeshave for which Letters Patent No. 368,003 were granted to us August 9, 1887.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the views.

Figure 1 is a plan view of the complete spokeshave. Fig. 2 is a transverse section on line $x\,x$ of Fig. 1. Fig. 3 is a perspective view of the cap-plate. Fig. 4 is a perspective view of the cutting-blade, and Fig. 5 is a perspective view of the cutting-blade and attached adjusting-plate. Fig. 6 is a perspective view of the adjusting-screw.

At each side of the central portion of the tool A, having the ordinary handles, $a$, and transversely the said tool, vertical ears B are formed, provided near their upper edge with a segmental slot, $b$, and a parallel integral offset, C, upon the inner face of the base.

In the body D of the tool, intervening the ears B, a central recess, $d$, is produced, and centrally and transversely the recess a threaded rod, E, is extended, provided with a milled head, $e$, at one end. One end of the transverse screw-rod is made to turn in an aperture, $e'$, produced horizontally in the forward wall of the body-recess $d$, the other end of said rod being journaled in the rear wall of said recess with the head $e$ outside.

A rectangular nut, F, is made to travel in the recess $d$ upon the threaded rod E, and upon said rod E, a short distance from the head, a collar, $f$, is formed, whereby the rod is prevented from having lateral play in its bearings.

A knife, G, having a central slot, $g$, is made to slide on the body-surface D over the recess $d$ between the transverse offsets C of the ears B. The knife, as shown in Fig. 1, is also provided with a small rectangular slot, $h$, to the rear of the main slot $g$, which slot $h$ is adapted to receive the traveling nut F, whereby, when the screw-rod E is manipulated, the knife is moved backward or forward across the face of the body. In the rear central edge of the knife a slot, $h'$, is cut, purposed to permit the free action of the screw-collar $f'$, and also to afford a convenient means for oiling the rear bearing of the said screw-rod.

An adjusting-plate, H, is provided for the knife of essentially the same shape, adapted to cover the upper surface, which adjusting-plate is beveled upon the outer edge and fitted with a central slot, H', exposing the slot $h$ in the knife, and at each side of the central slot, H', smaller slots, $k'$, are produced. The plate H is adjustably held upon the knife by means of screws $o$, passed through the aforesaid side slots, $k'$, and entered into the knife, as illustrated in Fig. 5.

The purpose of the plate H is to regulate the delivery of the shaving and cause the tool to cut as well across the grain as with it. In cutting across the grain the plate is slid a proper distance back of the knife-edge, as shown in Fig. 5. A cap-plate, K, is provided adapted to rest upon and partially cover the knife G, which plate rests against the inner surface of the transverse offsets C at the ends, being provided with end shoulders, $k$, purposed to bear against the rear ends of the said offsets and limit the forward motion of the cap-plate.

Centrally the cap-plate K, near the forward edge, an elongated slot, $m$, is produced, adapted to register with the slot $g$ in the knife and slot H' in the adjusting-plate, and through the forward end of the registering slots $m$, $g$, and H' a set-screw, M, is passed into a suitable threaded aperture in the body. At each side of the slot $m$ a smaller slot, $m^3$, is produced, purposed to accommodate the heads of the screws $o$.

In operation the set-screw is loosened and the head of the threaded rod E is manipulated to the right or left, accordingly as the knife is to be moved backward or forward. When the proper adjustment has been found, the set-screw is screwed down, the opening $m$ having previously been closed by means of a hinged cover, $m'$, to keep out the dust, and the said set-screw thereby retains the cover in place, as shown in Fig. 2, and prevents any movement of either the cap-plate or knife.

A guide, $M'$, consisting of the longitudinal bar $m^2$, having a flat under surface and more or less rounded corners, and provided with integral arms at right angles thereto, is adjustably held within the ears B by thumb-screw N, entering the slot $b$ in said ears, and also the said arms of the guide at their ends. When the guide $M'$ is thus positioned, the flat under surface thereof is normally in the same horizontal plane with the under flat surface of the body D. A space is, however, made to intervene the opposing edges of the said body D and the guide.

It will be observed that by reason of the slots $k'$ in the adjusting-plate and the screws $o$ all strain is removed from the clamping-screw M and the knife insured when manipulated a direct throw free from lateral vibration.

Having thus described our invention, what we claim as new, and desire to secure by Letters Patent, is—

1. In a spokeshave, the combination, with the body having a recess in the upper face, a threaded rod held to turn in the body-recess, and a rectangular nut traveling upon said rod in said recess, of a blade adapted to slide upon the body above the recess, having a slot cut therein to receive the nut, an adjusting-plate held to slide upon the knife, provided with guide-slots and guide-screws, a cap-plate resting upon said blade, slotted to accommodate the guide-screws, and a set-screw passing through the cap-plate and blade into the body, substantially as shown and described.

2. In a spokeshave, the combination, with the body having a recess in the upper face, a threaded rod held to turn transversely and horizontally in said body-recess and provided with a head upon the outer end, and a rectangular nut traveling upon said rod in said recess, of a blade adapted to slide upon the body above the recess, having a series of central slots cut therein, one of which is adapted to receive the nut, an adjusting-plate held to slide upon the knife, provided with a central slot, side guide-slots, and guide-screws, a cap-plate resting upon the said blade, provided with shoulders at opposite ends engaging the body, and a central slot and side slots accommodating the guide-screws, and a set-screw passing through the slot of the cap-plate, the central slot of the adjusting-plate, and through the registering slot in the knife into the body, substantially as shown and described.

JAMES H. POLHEMUS.
BENGAMIN F. POLHEMUS.

Witnesses:
J. F. ACKER, Jr.,
C. SEDGWICK.